United States Patent [19]
Maskalick

[11] 3,881,954
[45] May 6, 1975

[54] METHOD OF PRODUCING A LEAD DIOXIDE BATTERY PLATE

[75] Inventor: Nicholas J. Maskalick, Pittsburgh, Pa.

[73] Assignee: Westinghouse Electric Corporation, Pittsburgh, Pa.

[22] Filed: Mar. 18, 1974

[21] Appl. No.: 452,295

[52] U.S. Cl. .................................. 136/27; 136/75
[51] Int. Cl. ......................................... H01m 39/00
[58] Field of Search ............ 136/27, 26, 75, 76, 34, 136/35; 204/290

[56] References Cited
UNITED STATES PATENTS
3,287,165  11/1966  Jensen ................................. 136/65
3,318,794  5/1967  Kiyohara et al. ................. 136/27 X Primary Examiner—Anthony Skapars
Attorney, Agent, or Firm—D. P. Cillo

[57] ABSTRACT

A method of making a battery plate comprises the steps of thermally oxidizing the surface of a lead current collector, containing a maximum of 3 weight percent antimony, to form an interlocking porous layer primarily of PbO at least about ¼ mil thick, applying porous positive active material paste onto the PbO layer, sulfating the PbO layer and the applied positive active material paste with dilute $H_2SO_4$ to intermediately form a continuous active material layer, and anodizing the continuous active material layer in dilute $H_2SO_4$ to form a homogeneous final layer of $PbO_2$ interlocked and firmly attached to the lead current collector.

10 Claims, 8 Drawing Figures

METHOD OF PRODUCING A LEAD DIOXIDE BATTERY PLATE

BACKGROUND OF THE INVENTION

In the manufacturing of lead-acid storage battery plates, the final plate performance displays a critical dependence on the quality of the contact of the active material to the current collector. Poor contact often results in sub-standard, unstable initial performance. This condition may disappear during a "break-in" period of charge-discharge cycling, but in many cases, poor initial contact will result in unsatisfactory energy storage capability throughout the useful life of a lead-acid cell. Particular difficulty is encountered in producing an effective bond between lead or lead alloy current collectors and various basic lead sulfates or PbO or $Pb_3O_4$ battery active material, as an intermediate step prior to electrolytic conversion to lead dioxide. Faulty bonding at this stage results in low and unstable capacity in the final, "formed" cell.

Brush, in U.S. Pat. No. 266,089, tried to solve bonding problems by oxidizing lead particles to PbO, and pressure bonding them to a lead plate. This provided some measure of lead to lead contact bonding, where particles were pressed against each other or the plate, while providing oxide veins throughout the lead particle pressed mass. Morrison, in U.S. Pat. No. 1,067,437, also attempted to solve this problem by adding nitric acid to a "formed", electrolyzed, pasted lead plate. This dissolved some of the lead grid current collector, to provide a soluble lead compound, which was then reacted with sulfuric acid to produce a precipitated binding agent for the active material. There is a need, however, for a method of more intimately bonding a pasted intermediate active material, containing tetrabasic lead sulfate, for example, to the lead current collector before "forming"; so that after electrolysis, the resulting lead dioxide active material will be well bonded in the plate. Such an improved initial bond will permit near optimum cell capacities to be realized immediately after "formation", and to continue for the useful life of a lead-acid storage cell.

SUMMARY OF THE INVENTION

The above problems are solved by deliberate thermal oxidation of the surface of a lead current collector containing up to 3 weight percent Sb, in such a manner as to produce sharp, wedge-like oxide formations interlocking within the body of the lead current collector. This is accomplished by heating a substantially pure lead current collector in an oxidizing atmosphere such as air at between about 220° to 320°C for about ½ to 100 hours, to form a lead oxide (PbO) layer of about 2 to 30 percent porosity, i.e. 70 to 98 percent dense, between about ¼ to 20 mils thick, preferably ½ to 3 mils thick. In the case of lead alloys, the maximum temperature may be limited to about 250°C. The layer produced would have about 2 to 30 percent porosity, a thickness of between about ¼ to 3 mils and would comprise a mixture of oxides, with lead oxide (PbO) as the primary constituent.

The active material, comprising for example a porous paste mixture of $4PbO \cdot PbSO_4$, $PbO \cdot PbSO_4$, $3PbO \cdot PbSO_4 \cdot H_2O$ and free Pb, with a high $4PbO \cdot PbSO_4$ and low Pb content preferred, is applied to the thermally grown lead oxide layer on the supporting lead current collector after which the pasted plate is contacted with dilute sulfuric acid. If, for example, the paste mixture contains a significant amount of free lead, a "curing" step is included before sulfation. The resulting sulfation causes the thermally grown oxide layer and the applied active material layer to knit together, forming a homogeneous intermediate active material comprising primarily $4PbO \cdot PbSO_4$, $PbO \cdot PbSO_4$, $3PbO \cdot PbSO_4 \cdot H_2O$ and $PbSO_4$ bonded directly to the lead current collector, and interlocking with the body of the lead current collector. The entire oxide-sulfate mass is then converted by standard electrolysis, to a porous, homogeneous active material mass, attached to the current collector by wedge-like incursions, which pierce only into the body of the current collector, the mass averaging about 99 weight percent $PbO_2$.

BRIEF DESCRIPTION OF THE DRAWINGS

For a better understanding of the invention, reference may be made to the exemplary embodiments shown in the accompanying drawings, in which.

DESCRIPTION OF THE PREFERRED EMBODIMENTS

Figure 1:
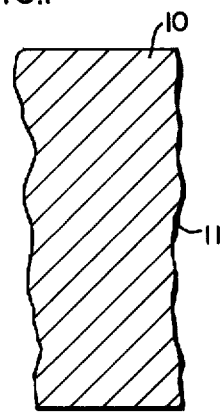
FIG. 1 shows, in a cross-sectional view, a lead current collector surface before thermal oxidation.

Referring to FIG. 1, a cross-sectional view of a battery current collector member 10 is shown with a relatively smooth flat pasting surface 11. In the method of this invention, substantially pure (about 99.5+percent) lead current collectors are preferred, since they allow a much greater degree of interlocking lead oxide incursions into the surface 11. However, active material bonding is much improved by the method of this invention using lead current collectors also containing up to 3 weight percent antimony, up to about 0.2 weight percent calcium and trace amounts of other ingredients such as tin, arsenic and cadmium.

Substantially pure lead grids provide a large metal grain structure, providing extended crystal plane orientations along which the roots of the PbO thermally grown layer can propagate. Inclusion of over 3 weight percent antimony results in a much smaller grain structure in the lead, not allowing good root or wedge penetration and oxide bonding.

Figure 2:
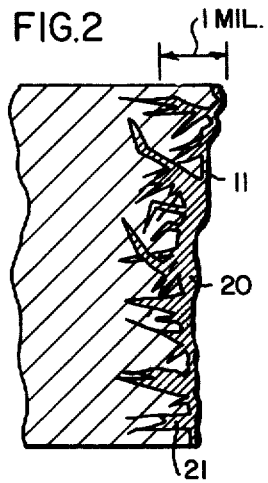
FIG. 2 shows, in a cross-sectional view, the lead current collector after thermal oxidation, showing the preferred oxide incursions into the body of the lead.

FIG. 2 shows the lead current collector after thermal oxidation. The oxide layer 20 consists essentially of lead monoxide, PbO. It is about 2 to 30 percent porous, i.e. 70 to 98 percent dense. It is thermally grown to a thickness of between about ¼ to 20 mils (0.00025–0.020 inch or 0.0006–0.050 cm), but preferably between about ½ to 3 mils. When lead alloy current collectors containing 3 weight percent antimony are used, the oxide layer comprises primarily PbO with about 3 weight percent $Sb_2O_3$. The layer is about 2 to 30 percnet porous and because of lower temperatures employed has a thickness of between about ¼ to 3 mils, preferably between about ½ to 2 mils. While the oxide layer can contain up to 3 weight percent $Sb_2O_3$, after pasting, sulfation and anodizing, the $Sb_2O_3$ content in the final active material is reduced to about 0.03 weight percent, the final active material mass consisting essentially of 99 weight percent $PbO_2$ on average.

As shown in FIG. 2, much of the thickness of the PbO layer, i.e. at least about ¼ to 3 mils deep constitutes the sharp wedge-like formations piercing the lead grid surface and interlock bonding within the current collector.

The thermal oxidation is accomplished by heating the grid in an oxygen environment, generally in air, in a furnace or with other suitable heating means. The temperature must be between about 220° to 320°C when a substantially pure (about 99.5+ percent) lead current collector is used, and between about 220° to 250°C when a lead current collector containing about ½ to 3 weight percent antimony is used. Generally, the thermal oxidation step will take place over a ½ to 100 hour period depending on the temperature used.

Thicknesses of oxide layers less than ¼ mil will not appreciably improve bonding. Thicknesses greater than 20 mils will provide a PbO layer which cannot be easily penetrated and sulfated by sulfuric acid, and may leave an undesirable PbO residue. This residue would have high electrical resistance characteristics which could insulate the active material from the lead member, resulting in both a reduction of voltage and capacity of the positive plate. The oxide layer must be porous enough so that sulfuric acid can effectively penetrate to sulfate the layer in subsequent steps.

Also shown in FIG. 2 are the needle like lead monoxide root formations 21, which pierce the lead surface 11, generally between the metal grain planes, and form wedge type interlocking incursions into the body of the lead. These formations within the lead current collector are very pronounced when substantially pure lead is used, leading to excellent bonding of the thermally grown PbO layer. These formations, at the lead-lead monoxide interface, provide a vastly increased surface area of active material contact with the current collector.

Figure 3:
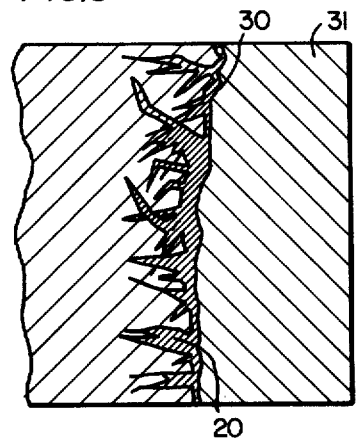
FIG. 3 shows, in a cross-sectional view, the oxidized lead current collector with dual layers after active battery paste application.

FIG. 3 shows the oxidized lead current collector after battery active material is pasted, roll pressed or otherwise applied by a suitable means to the oxide surface 30. The active material 31 will preferably consist essentially of a mixture of $4PbO \cdot PbSO_4$, $PbO \cdot PbSO_4$ and $3PbO \cdot PbSO_4 \cdot H_2O$. The predominant material is tetrabasic lead sulfate, $4PbO \cdot PbSO_4$, which constitutes about 80 to 95 weight percent of the preferred material, formed by careful addition of sulfuric acid to a heated slurry of orthorhombic lead monoxide, to yield 10–50 micron size needle like crystals:

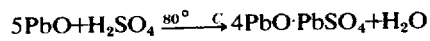

$$5PbO + H_2SO_4 \xrightarrow{80°C} 4PbO \cdot PbSO_4 + H_2O$$

Other battery active materials that can be used and similarly applied to the oxide surface 30 include a wide range of other mixtures of the above basic sulfates, with or without moderate amounts (5–30 weight percent) of free lead, and also battery red lead $Pb_3O_4$ and orthorhombic PbO.

Figure 6:
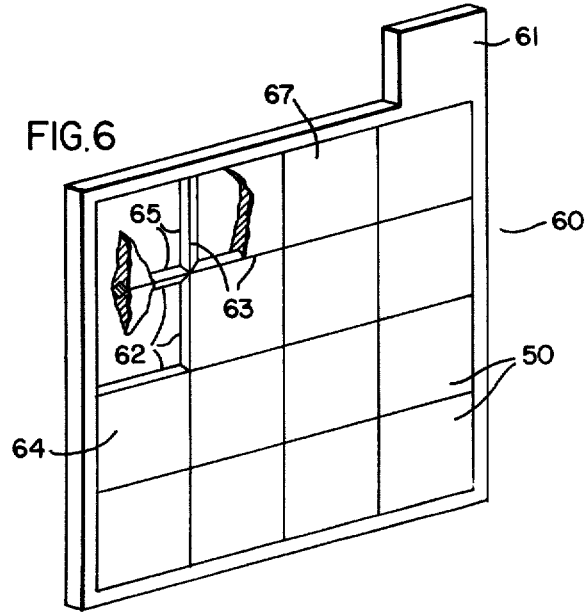
FIG. 6 shows, in a three dimensional partially sectioned view, a typical lead battery plate after anodizing, a typical triangular grid bar being sectioned.

The active material is preferably applied as an aqueous paste, by any suitable means to the supporting current collector, so that the maximum distance from the current collector surface to the surface of the finished plate is between about 10 to 400 mils (0.010–0.40 inch or 0.025–1.0 cm), but preferably between about 75 to 150 mils. Distances less than 10 mils will not generally provide sufficient active material loading to provide adequate commercial energy per loaded plate. Distances greater than 400 mils will provide a mixed basic lead sulfate layer which cannot be easily penetrated by sulfuric acid during sulfation of the thermally-grown PbO layer. FIG. 6 shows a typical grid battery active material support with diamond cross section grid bars. In this case, the distance described would be from the interior edge or center of the grid 65 to the surface of the finished plate 67. Generally, the active material layer is about 25 to about 60 percent porous, i.e. 40 to 75 percent dense. A curing step may be included at this point to reduce any free lead in the active material to a specified level, preferably, less than 5 weight percent. Preferred active material will contain no Pb since it is an inert initial battery material. Curing generally consists of heating in an oven operating in a moist air atmosphere of up to 100 percent humidity at temperatures up to about 90°C.

Figure 4:
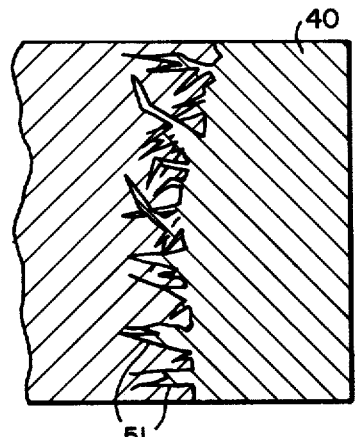
FIG. 4 shows, in a cross-sectional view, the pasted lead current collector after sulfation, with an attached, uniform, continuous, intermediate active material mass.

FIG. 4 shows the pasted lead current collector after sulfation. In this step, the pasted battery active material, comprising, for example, a porous tetrabasic lead sulfate layer, is contacted with dilute sulfuric acid having a specific gravity between about 1.05 to about 1.15. This step must occur at a temperature between about 15° to about 35°C, generally by immersion or dipping of the pasted plate. The sulfuric acid also permeates into and reacts with the porous lead monoxide layer to form a mixture of basic lead sulfates. As a result of this sulfation, substantially all of the thermally grown oxide layer knits together with the pasted active material layer to become a homogeneous, uniform mass of intermediate active material 40, consisting essentially of a mixture of $4PbO \cdot PbSO_4$, $PbO \cdot PbSO_4$, $3PbO \cdot PbSO_4 \cdot H_2O$ and $PbSO_4$. This intermediate layer is capable of anodization to form a final active material layer consisting essentially of porous $PbO_2$. As can be seen, this intermediate active material interlocks with the lead surface, particularly with substantially pure lead current collectors, and pierces deeply into the body of the lead current collector or grid.

The sulfation reaction with sulfuric acid must be of sufficient duration, generally about ¼ to 1 hour sulfuric acid contact, and at an acid concentration and temperature suitable to insure essentially complete permeation of the sulfuric acid and reaction of the lead monoxide. It is critical that substantially no PbO residue is left to insulate or block the active material from the lead member. Sulfation at temperatures greater than about 35°C, times greater than about 1 hour, and in acid with a specific gravity greater than about 1.15 will produce substantial amounts of very dense $PbSO_4$ in the intermediate active material, which acts as an insulator, and is difficult to convert to $PbO_2$.

Figure 5:
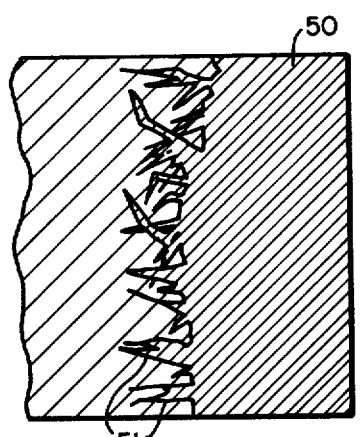
FIG. 5 shows, in a cross-sectional view, the pasted lead current collector after anodizing, with attached, uniform, continuous, homogeneous, final active material.

After the sulfation step, in the method of this invention, the lead current collector containing the intermediate active material is subjected to the customary electrolytic anodization "oxidizing or forming" action, well known in the art. This is accomplished by connecting it as an anode in an electrolyte of dilute sulfuric acid, and charging the intermediate active material. During this electrolytic reaction the entire oxide-sulfate mass is converted to a uniform, porous, well bonded mass containing about 99 weight percent lead dioxide, shown in FIG. 5 as 50 with its wedge-like incursions 51 into the current collector shown. As can be seen, the mass is not particulate but is homogeneous, with no veins of PbO or other materials running through it, the wedge-like incursions piercing only into the body of the current collector. This uniform composition-mass being bonded is to be an intimate part of the collector plate. This final $PbO_2$ mass is about 50 to about 70 percent porous, i.e. 30 to 50 percent dense.

FIG. 6 shows the final lead battery plate 60 with lug 61 extending upwardly from the current collector in a conventional manner. The bonded lead dioxide mass 50 is shown, as are, in a cutaway view, typical grid bars 62. The grid bars generally have a diamond shaped cross section with sharp exterior edge 63 defining the plurality of plate compartments 64 containing the active battery material 50. The interior edge 65 is also shown. The diamond shaped grid bars allow good supporting characteristics, since the active material is disposed around them. It is to be understood that a wide variety of current collector designs can be used in the thermal oxidation method of this invention.

The anodization step is generally conducted by connecting the battery plates of this invention as anodes, and alternating lead containing negative plates as cathodes, to a D.C. power supply, and placing them in a container with a solution of dilute sulfuric acid having a specific gravity between about 1.05 to 1.15 at a temperature between about 15° and 35°C. Sufficient current is then applied to produce the final $PbO_2$ active material. Anodization at temperatures greater than 35°C and in acid with a specific gravity greater than 1.15 will tend to produce undesirable $PbSO_4$ material.

Generally, the sulfation step is allowed to proceed in the container of sulfuric acid prior to electrolysis. After electrolysis, the acid is replaced with sulfuric acid having a specific gravity of about 1.28, terminal posts are welded to the lugs, and a suitable top is welded to the container to form a battery cell.

EXAMPLE 1

Figure 7:
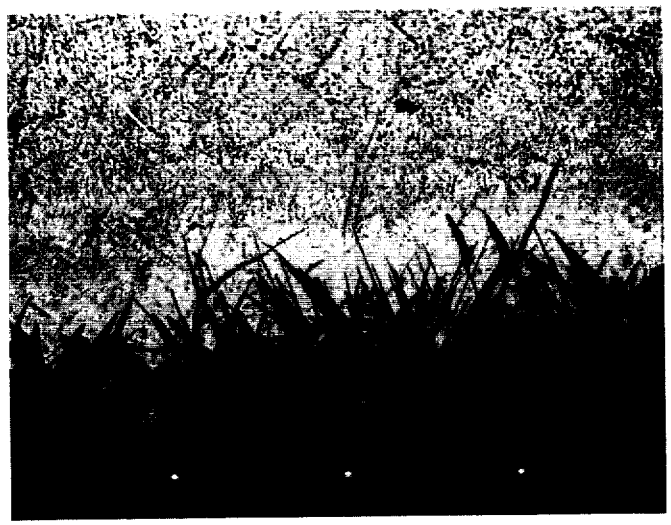
FIG. 7 shows a photomicrograph of the thermally grown oxide layer type bonding of this invention.
Figure 8:
FIG. 8 shows a photomicrograph of a pressure rolled oxide bonded layer.

Two substantially pure lead current collectors (Doe Run, 99.99+ percent lead) 9×11×0.055 inch, having a flat surface, were placed in a furnace, in air, at about 270°C for 40 hours. At the end of this period they were cooled and examined. A thin oxide layer could be seen, and photomicrographs (FIG. 7) showed a PbO layer about one to two mils thick over the lead interface, with interlocking wedge or needle like PbO roots, continuous along the lead surface and piercing into the lead surface to a depth of about ¼ to 1½ mils. This thermally grown in situ oxide layer was about 5 percent porous, as determined by void distribution observations of a micro cross-section. Other more exact tests of porosity would include Mercury Intrusion and Nitrogen Gas Absorption-BET tests. The oxide layer was extremely well bonded to both sides of the flat lead surface so as to become an intimate part of it. FIG. 7 shows a photomicrograph of the thermally grown oxide layer of this invention, with needle-like formations gripping into the current collector. Experiments were also conducted wherein a thin 1½ mil sheet of PbO was pressure roll bonded to the surface of a current collector. FIG. 8 shows a photomicrograph of the roll bonded oxide layer. As can be seen, the thermally grown oxide layer of this invention forms a much more superior and intimate bond for the PbO and subsequently formed $PbO_2$ final active material.

Porous active material, comprising about 90 weight percent $4PbO \cdot PbSO_4$ with the remainder a mixture of $PbO \cdot PbSO_4$ and $3PbO \cdot PbSO_4 \cdot H_2O$, was pasted with a spatula onto both sides of both current collectors, to a thickness on each side of about 120 mils.

These two pasted plates were alternated with three 9×11×0.15 inch lead containing plates, which were to act as suitable cathodes during electrolysis, and the cell placed in a small polyethylene cell case. Microporous rubber separators were placed between the pasted positive plates and adjacent negative plates.

Then, dilute sulfuric acid having a specific gravity of about 1.05 was added to the battery cell case, so that it contacted and permeated into the porous layers of the pasted plates. After about ½ hour the pasted positive plates were connected in series as anodes and the negative plates connected in series as cathodes to a D.C. power supply. During the prior ½ hour period, sulfation occurred in the pasted positive plates to provide an intermediate active material comprising a mixture of $4PbO \cdot PbSO_4$, $PbO \cdot PbSO_4$, $3PbO \cdot PbSO_4 \cdot H_2O$ and $PbSO_4$ and substantially no amount of PbO. The mixture contained about 90 weight percent $4PbO \cdot PbSO_4$.

A current of 5 amps was applied to the cell for a period of 7 days to completely "form" the pasted current collectors and convert the intermediate active material to substantially pure (about 99 weight percent) lead dioxide, $PbO_2$, final active material of about 45 to 65 percent porosity. The entire process was carried out at about 25°C and the final active material loading per positive plate was about 680 grams.

The sulfuric acid was poured out and new sulfuric acid, having a specific gravity of 1.29 added. The above positive plates provided a six hour rate capacity of about 40 Ah each. This 80 Ah system was run at a 13.3 ampere discharge current on charge-discharge cycle testing at 80°C for 450 cycles with stable performance. The initial capacity was 70 percent of the stabilized capacity at 5 cycles. This is considerably improved performance over control cells employing pure lead positive current collectors with no thermal oxide bond. Such control samples displayed erratic and unpredictable performance with many actually declining in capacity after the initial discharge.

The pasted positive plates were subsequently removed from the battery cell and the active material was still well bonded to the lead surface. This method of oxide growing, pasting, conversion to a uniform homogeneous active material by sulfation, and subsequent anodization "forming" to the final active material, allows pure lead to be employed as a current collector material in lead acid storage cells for charge discharge cycling service. Such cells display improved initial capacity, approaching ultimate, stable capacity more closely than cells not employing thermal oxide bonding. Such cells, having a bonding area of uniform quality over the entire thermally oxidized surface of positive current collector are inherently more uniform and consistent in performance than comparable cells without thermal oxide bonding.

It is for the latter reason that this invention would enhance the quality control of positive plates employing low antimony alloy lead type current collectors. The pasting and curing of such positive plates are critical parameters influencing final plate performance because of grid-to-active material bonds effected in these procedures. Use of this invention would improve the overall performance and maintain greater quality control with less deleterious influence due to pasting and curing effects.

Also, the particular importance of this invention in making available pure lead as a positive current collector material should be emphasized. Pure lead, being more corrosion resistant than lead alloys, is a preferred material to be employed in lead-acid storage cells. Yet, because of their higher strength and more reliable active material bonding characteristics, high antimony lead alloy materials containing about 4 to 8 percent antimony have been employed historically, almost exclusively at the cost of shorter life. In suitably designed cells, the lower strength of pure lead is no longer a problem, so that the subject invention in providing for an improved bond to the positive active material makes longer-life pure lead or very low antimony lead alloy battery plates possible.

I claim as my invention:

1. A method of making a lead dioxide battery plate comprising the steps of:
   A. heating a current collector comprising lead and up to 3 weight percent antimony in an oxidizing atmosphere, to form an interlocking porous layer at least about ¼ mil thick consisting essentially of PbO on the current collector surface;
   B. applying a porous layer of positive active material paste onto the PbO;
   C. contacting the porous layers with sulfuric acid having a specific gravity between about 1.05 to about 1.15, at a temperature between about 15° to 35°C, to penetrate the porous layers and to sulfate the PbO and active material layers, forming a homogeneous intermediate active material mass comprising tetrabasic lead sulfate interlocking with the current collector;
   D. anodizing the current collector with the interlocked intermediate active material mass in sulfuric acid having a specific gravity between about 1.05 to about 1.15, at a temperature between about 15° to 35°C, to produce a porous, homogeneous final active material mass comprising lead dioxide firmly interlocked to the current collector.

2. The method of claim 1 wherein the current collector consists essentially of at least 99.5 weight percent lead, the PbO layer formed in step (A) is about 2 to 30 percent porous, and about ½ to 20 mils thick, the heating of step (A) is between about 220° to 320°C, the active material layer applied in step (B) is about 25 to 60 percent porous and the final active material is about 50 to 70 percent porous.

3. The method of claim 1 wherein the PbO layer formed in step (A) is about ½ to 3 mils thick and positive active material layer applied in step (B) has a thickness such that the maximum distance from the current collector surface to the surface of the finished plate is between about 10 to 400 mils.

4. The method of claim 1 wherein the current collector consists essentially of lead and from ½ to 3 weight percent antimony and the heating of step (A) is between about 220° to 250°C.

5. The method of claim 1 wherein the current collector has a relatively smooth surface before heating, and wherein, after heating in step (A), the lead surface is pierced by wedge like PbO formations to a depth of about ¼ to 3 mils.

6. The method of claim 5 wherein the active material applied in step (B) is selected from the group consisting of $Pb_3O_4$ and PbO.

7. The method of claim 5 wherein the active material applied in step (B) is a mixture comprising $4PbO \cdot PbSO_4$, $PbO \cdot PbSO_4$ and $3PbO \cdot PbSO_4 \cdot H_2O$.

8. The method of claim 7 wherein the intermediate active material formed in step (C) is a mixture consisting essentially of $4PbO \cdot PbSO_4$, $PbO \cdot PbSO_4$, $3PbO \cdot PbSO_4$ and $PbSO_4$, and wherein substantially all of the PbO layer is permeated by sulfuric acid in step (C) and sulfated to form a uniform, continuous, intermediate active material mixture layer, said layer having substantially no PbO residue to insulate the active material from the lead current collector.

9. A method of making a lead dioxide battery plate comprising the steps of:
   A. hetaing in air a current collector consisting essentially of at least 99.5 weight percent lead, having a relatively smooth surface, at a temperature between about 220° to 320°C for ½ to 100 hours, to form a porous layer on the current collector about ¼ to 20 mils thick consisting essentially of PbO, said lead surface being pierced by wedge-like, interlocked PbO formations to a depth of about ¼ to 3 mils;
   B. applying a porous layer of a lead active material mixture comprising tetrabasic lead sulfate onto the PbO;
   C. contacting the layers with sulfuric acid having a specific gravity between about 1.05 to about 1.15, at a temperature between about 15° to 35°C, so that the sulfuric acid permeates the layers to sulfate the PbO and tetrabasic lead sulfate material, to form a homogeneous, uniform, continuous, intermediate active material mass interlocking with the current collector, there being substantially no PbO residue to insulate the active material from the lead current collector;
   D. anodizing the current collector with the interlocked intermediate active material mass in sulfuric acid having a specific gravity between about 1.05 to about 1.15, at a temperature between about 15° to 35°C in a suitable container, to produce a porous, homogeneous final active material consisting essentially of lead dioxide firmly interlocked into the current collector by wedge-like, $PbO_2$ formations about ¼ to 3 mils deep.

10. The method of claim 9 wherein the PbO layer formed in step (A) is about 2 to 30 percent porous, the final active material produced in step (D) is about 50 to 70 percent porous, and the current collector with the PbO layers and loaded active material layers is dipped into sulfuric acid in step (C).

* * * * *